United States Patent
Ahn et al.

(10) Patent No.: US 9,666,901 B2
(45) Date of Patent: May 30, 2017

(54) ADDITIVE FOR ELECTROLYTE SOLUTION, NON-AQUEOUS ELECTROLYTE SOLUTION INCLUDING THE ADDITIVE AND LITHIUM SECONDARY BATTERY INCLUDING THE ELECTROLYTE SOLUTION

(71) Applicant: LG Chem, Ltd., Seoul (KR)

(72) Inventors: Kyoung Ho Ahn, Daejeon (KR); Chul Haeng Lee, Daejeon (KR); Doo Kyung Yang, Daejeon (KR); Young Min Lim, Daejeon (KR); Yu Ha An, Daejeon (KR); Min Jung Kim, Incheon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/014,813

(22) Filed: Aug. 30, 2013

(65) Prior Publication Data

US 2014/0011081 A1 Jan. 9, 2014

Related U.S. Application Data

(63) Continuation of application No. PCT/KR2013/000725, filed on Jan. 30, 2013.

(30) Foreign Application Priority Data

Apr. 30, 2012 (KR) ........................ 10-2012-0045627

(51) Int. Cl.
*H01M 10/056* (2010.01)
*H01M 10/0567* (2010.01)
*H01M 10/052* (2010.01)

(52) U.S. Cl.
CPC ....... *H01M 10/056* (2013.01); *H01M 10/052* (2013.01); *H01M 10/0567* (2013.01); *H01M 2300/0025* (2013.01); *Y02T 10/7011* (2013.01)

(58) Field of Classification Search
CPC ........................ H01M 10/056; H01M 10/0567
(Continued)

(56) References Cited

U.S. PATENT DOCUMENTS

2003/0157413 A1* 8/2003 Chen et al. .................. 429/326
2004/0259000 A1 12/2004 Adachi et al.
(Continued)

FOREIGN PATENT DOCUMENTS

CN 1610174 A 4/2005
CN 1722509 A 1/2006
(Continued)

OTHER PUBLICATIONS

International Search Report from PCT/KR2013/000725, dated May 29, 2013.
(Continued)

*Primary Examiner* — Jonathan Jelsma
(74) *Attorney, Agent, or Firm* — Lerner, David, Littenberg, Krumholz & Mentlik, LLP

(57) ABSTRACT

An additive for an electrolyte solution includes a lithium salt having an oxalato complex as an anion and a compound represented by following Chemical Formula 1.

[Chemical Formula 1]

(Continued)

Wherein, a represents C or Si, b represents H or F, and n represents an integer of 1 to 5. A non-aqueous electrolyte solution including the additive and a lithium secondary battery including the electrolyte solution also are provided.

17 Claims, 3 Drawing Sheets

(58) Field of Classification Search
USPC .......................................................... 429/200
See application file for complete search history.

(56) References Cited

U.S. PATENT DOCUMENTS

| | | | |
|---|---|---|---|
| 2005/0221195 A1* | 10/2005 | Uchida | H01B 1/122 |
| | | | 429/313 |
| 2006/0240327 A1 | 10/2006 | Xu et al. | |
| 2008/0166637 A1* | 7/2008 | Inagaki | H01M 4/366 |
| | | | 429/329 |
| 2008/0193854 A1* | 8/2008 | Yamaguchi et al. | 429/330 |
| 2009/0226808 A1* | 9/2009 | Hiwara | H01G 9/038 |
| | | | 429/200 |
| 2010/0209780 A1 | 8/2010 | Muldoon et al. | |
| 2010/0209782 A1 | 8/2010 | Choi et al. | |
| 2011/0111288 A1* | 5/2011 | Nishida | C01B 25/455 |
| | | | 429/199 |
| 2011/0223476 A1 | 9/2011 | Kobayashi et al. | |
| 2011/0274983 A1* | 11/2011 | Yontz et al. | 429/309 |
| 2011/0300430 A1* | 12/2011 | Usami et al. | 429/144 |
| 2012/0007560 A1* | 1/2012 | Smart et al. | 320/127 |
| 2012/0060360 A1 | 3/2012 | Liu | |
| 2012/0141883 A1* | 6/2012 | Smart et al. | 429/331 |
| 2012/0202122 A1* | 8/2012 | Han | 429/326 |
| 2012/0231325 A1* | 9/2012 | Yoon et al. | 429/163 |
| 2012/0244419 A1* | 9/2012 | Kwak | H01M 10/0525 |
| | | | 429/163 |
| 2013/0330610 A1* | 12/2013 | Shigematsu | H01M 10/0567 |
| | | | 429/200 |

FOREIGN PATENT DOCUMENTS

| | | |
|---|---|---|
| CN | 1840550 A | 10/2006 |
| CN | 102315483 A | 1/2012 |
| CN | 102394314 A | 3/2012 |
| EP | 2224532 A1 | 9/2010 |
| EP | 2498329 A1 | 9/2012 |
| JP | 2010-192430 A | 9/2010 |
| JP | 2011054406 A | 3/2011 |
| JP | 2011-187410 A | 9/2011 |
| KR | 20050068669 A | 7/2005 |
| KR | 20070073386 A | 7/2007 |
| KR | 2009-0039211 A | 4/2009 |
| WO | 2011124038 A1 | 10/2011 |

OTHER PUBLICATIONS

Kang Xu, et al., "Nonflammable Electrolytes for Li-ion Batteries Based on a Fluorinated Phosphate." Journal of the Electrochemical Society, vol. 149, No. 8, Jul. 2, 2002, p. A1079, XP055186326.

Supplemental Search Report from European Application No. 13 78 4877, dated Sep. 1, 2015.

* cited by examiner

ADDITIVE FOR ELECTROLYTE SOLUTION, NON-AQUEOUS ELECTROLYTE SOLUTION INCLUDING THE ADDITIVE AND LITHIUM SECONDARY BATTERY INCLUDING THE ELECTROLYTE SOLUTION

CROSS-REFERENCE TO RELATED APPLICATIONS

This application is a continuation of International Application No. PCT/KR2013/000725 filed on Jan. 30, 2013, which claims priority from Korean Patent Application No. 10-2012-0045627 filed with Korean Intellectual Property Office on Apr. 30, 2012, the entire contents of which are incorporated herein by reference.

BACKGROUND OF THE INVENTION

The present invention relates to an additive for an electrolyte solution including a lithium salt having an oxalato complex as an anion and a phosphate compound, a non-aqueous electrolyte solution including the additive and a lithium secondary battery including the electrolyte solution. More particularly, the present invention relates to an additive for an electrolyte solution for forming a lithium secondary battery having an improved lifetime characteristic and good power characteristics.

As the technical development and the demand on mobile devices increase, the demand on secondary battery as an energy source has been rapidly increased. Among the secondary batteries, a lithium secondary battery having a high energy density and voltage has been commercialized and widely used.

Recently, the lithium secondary battery has been developed as a power source of an electric power storing equipment or a power source for mounting on a vehicle in a medium-large size industry as well as a power source for a small-sized device.

Particularly, a battery for hybrid electric vehicles is required to have high power characteristics for operating an auxiliary motor of an engine power instantaneously or high power characteristics at a low temperature under a severe condition.

In order to use the battery for the power source in the medium-large size industry, a battery having a long lifetime may be necessary when considering that a plurality of the batteries may be assembled to use, and the exchange of the batteries may incur expenses.

SUMMARY OF THE INVENTION

An aspect of the present invention is solving technical objects necessary until now.

Another aspect of the present invention provides a non-aqueous electrolyte solution using an additive including a lithium salt having an oxalato complex as an anion and a constant amount of a phosphate compound, and a lithium secondary battery including the same and having an improved lifetime characteristic and good power characteristics at a low temperature.

According to an aspect of the present invention, there is provided an additive for an electrolyte solution including a lithium salt having an oxalato complex as an anion and a compound represented by following Chemical Formula 1.

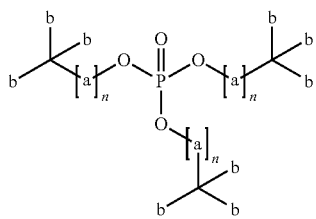

[Chemical Formula 1]

Wherein, a represents C or Si, b represents H or F, and n represents an integer of 1 to 5.

According to another aspect of the present invention, there is provided a non-aqueous electrolyte solution including an additive including a lithium salt having an oxalato complex as an anion and a compound represented by following Chemical Formula 1, a non-aqueous organic solvent and a lithium salt.

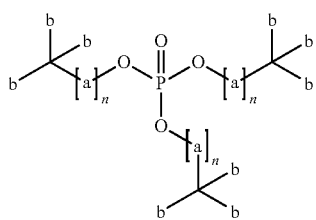

[Chemical Formula 1]

Wherein, a represents C or Si, b represents H or F, and n represents an integer of 1 to 5.

According to another aspect of the present invention, there is provided a lithium secondary battery including a cathode including a cathode active material, an anode including an anode active material, a separator interposed between the cathode and the anode, and the non-aqueous electrolyte solution. The cathode active material includes a manganese spinel active material, a lithium metal oxide or a mixture thereof.

Through including an additive for a non-aqueous electrolyte solution and a non-aqueous electrolyte solution according to the present invention, a lithium secondary battery illustrating an improved cycle lifetime characteristic through forming a solid electrolyte interphase (SEI) film, having an improved interface characteristic at the interface of an electrode and the electrolyte solution during charging and discharging, and having an improved mobility of lithium ions to decrease the resistance at the interface and improve an power characteristics, may be provided.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF PREFERRED EMBODIMENTS

Figure 1:
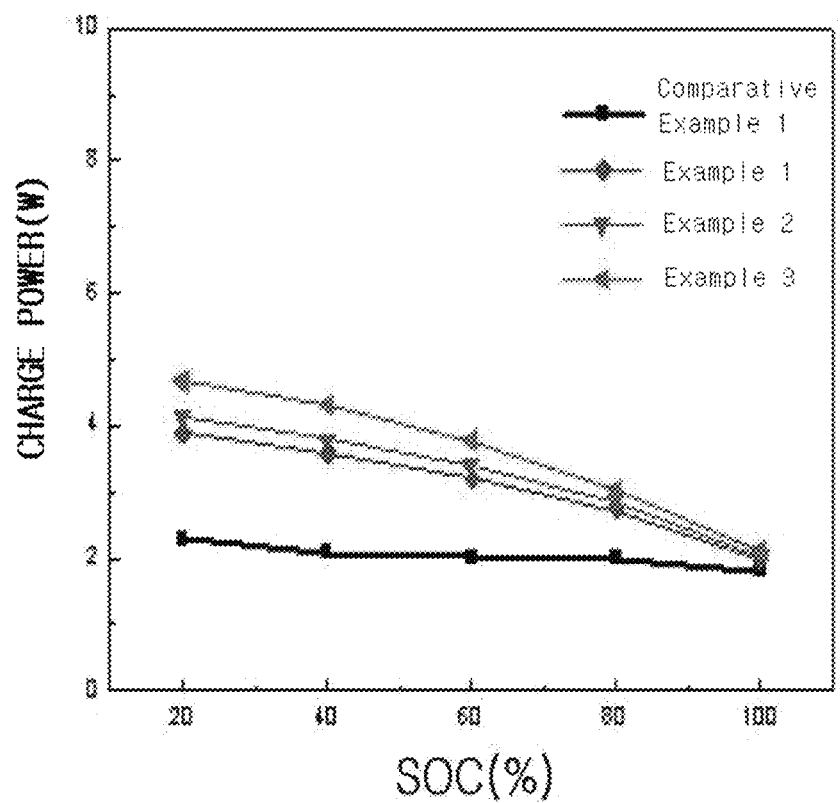
FIG. 1 is a graph illustrating a charge power characteristic of a secondary battery including an additive for an electrolyte solution, measured at a low temperature (−30° C.) according to Experiment 1 of the present invention.

Exemplary embodiments of the present invention will now be described in detail. It is noted that terms or words used in the specification and the claims should not be limited to the common meaning or the dictionary definition, but should be construed as meanings or concepts corresponding with the technical sprit of the present invention, based on the principle that the inventor can appropriately define the concepts of the terms to best describe his own invention.

The additive for an electrolyte solution in accordance with exemplary embodiments may include a lithium salt having an oxalato complex as an anion and following compound represented by Chemical Formula 1.

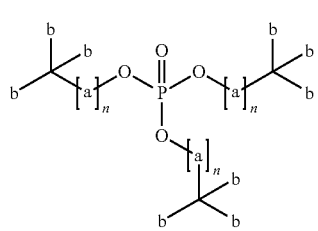

[Chemical Formula 1]

Wherein, a represents C or Si, b represents H or F, and n represents an integer of 1 to 5.

An SEI film may be formed by the lithium salt having the oxalato complex as the anion, and through the SEI layer, the lifetime characteristic of a lithium secondary battery may be improved. However, the SEI film may be a resistance layer inhibiting the movement of lithium ions, and the output deterioration of the lithium secondary battery may be generated. However, when the phosphate compound having Chemical Formula 1 is added, an interface property between an electrode and an electrolyte solution may be improved to decrease the resistance of the battery. In this case, the power characteristics of the lithium secondary battery may be remarkably improved.

According to the present invention, the lithium salt including the oxalato complex as an anion may form an SEI film through a redox reaction at the surface of an electrode. Through the formation of the SEI film the lifetime of the lithium secondary battery may be improved. At the same time, the phosphate compound of Chemical Formula 1 may not participate in the SEI film forming reaction, however, may decrease the resistance inhibiting the charge transfer reaction of lithium ions during charging and discharging to facilitate the transfer of the lithium ions. The defects concerning the decrease of the power characteristics possibly generated by the lithium salt including the oxalato complex as the anion may be solved by adding the phosphate compound of Chemical Formula 1.

Particularly, in order to commercialize a medium-large size battery, the lifetime characteristic improvement of the battery and the power improvement at a low temperature may be very important when comparing with a small-size battery. An additive for an electrolyte solution including a lithium salt having an oxalato complex as an anion and a phosphate compound may be provided in the present invention. In addition, a non-aqueous electrolyte solution and a lithium secondary battery including the same, having an improved lifetime characteristic and an improved power characteristics at a low temperature circumstance (−30° C., see Example 1) by decreasing the resistance of an SEI film formed at the surface of an electrode, are provided.

In an example embodiment, the oxalato complex included as an anion complex in the lithium salt may include any compound possibly forming a complex through a coordination bond, etc. of an anion compound including an oxalate group and a lithium ion. For example, the oxalato complex may be at least one selected from the group consisting of lithium difluoro(oxalato)borate (LiODFB), lithium tetrafluoro(oxalato) phosphate (LiTFOP) and lithium bis(oxalato)borate (LiBOB).

When adding the lithium salt having the oxalato complex as the anion in the electrolyte solution, the lithium salt having the oxalato complex as the anion may be included in an amount of 0.2 to 2% by weight based on the total amount of the electrolyte solution. When the amount of the lithium salt having the oxalato complex as the anion is less than 0.2% by weight, a stable SEI film may be insufficiently formed, and when the amount of the lithium salt exceeds 2% by weight, the thickness of the SEI film may become large to excessively increase an internal resistance.

In an example embodiment, the compound of Chemical Formula 1 may be at least one selected from the group consisting of tris(trimethylsilyl)phosphate (TMSP) and tris (2,2,2-trifluoroethyl)phosphate (TFEP).

When adding the compound of Chemical Formula 1 into the electrolyte solution, the amount of the compound of Chemical Formula 1 may be preferably 0.01 to 2% by weight based on the total amount of the electrolyte solution, and may be more preferably 0.01 to 1% by weight. When the amount of the compound of Chemical Formula 1 is less than 0.01% by weight, power characteristics improving effect may be insufficient, and when the amount exceeds 2% by weight, the power characteristics improving effect may be remarkable, however, a side reaction inhibiting the power characteristics and the stability of the battery may be induced.

According to another aspect of the present invention, a non-aqueous electrolyte solution including an additive for an electrolyte solution, including a lithium salt having an oxalato complex as an anion and a compound of following Chemical Formula 1, a non-aqueous organic solvent and a lithium salt may be provided.

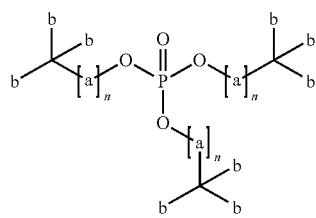

[Chemical Formula 1]

Wherein, a represents C or Si, b represents H or F, and n represents an integer of 1 to 5.

The non-aqueous electrolyte solution according to the present invention may include both of the lithium salt having the oxalato complex as the anion and the compound of Chemical Formula 1, and may illustrate an improved cycle lifetime characteristic and power characteristics improving effect due to the interaction of the two compounds.

The non-aqueous electrolyte solution according to the present invention may further include a lithium salt other than the lithium salt having the oxalato complex as the anion used as the additive for the electrolyte solution. The lithium salt may include common lithium salts used in an electrolyte solution for a lithium secondary battery such as $LiPF_6$, $LiAsF_6$, $LiCF_3SO_3$, $LiN(CF_3SO_2)_2$, $LiBF_4$, $LiBF_6$, $LiSbF_6$, $LiN(C_2F_5SO_2)_2$, $LiAlO_4$, $LiAlCl_4$, $LiSO_3CF_3$ and $LiClO_4$, etc. These compounds may be used alone or may be used as a mixture of two or more.

In addition, the non-aqueous organic solvent included in the non-aqueous electrolyte solution may be any solvent minimizing the decomposition thereof due to an oxidation reaction, etc. during charging and discharging of the battery and illustrating desired property along with the additive, without limitation. For example, the non-aqueous organic solvent may include a cyclic carbonate, a linear carbonate, an ester, an ether, a ketone, etc. These compounds may be used alone or as a mixture of two or more. Among the organic solvents, carbonate-based organic solvents may be preferably used, for example, the cyclic carbonate such as ethylene carbonate (EC), propylene carbonate (PC) and butylene carbonate (BC), and the linear carbonate such as dimethyl carbonate (DMC), diethyl carbonate (DEC), dipropyl carbonate (DPC), ethyl methyl carbonate (EMC), methyl propyl carbonate (MPC) and ethyl propyl carbonate (EPC) may be typically used.

In an example embodiment, the non-aqueous electrolyte solution may further include at least one additive selected from the group consisting of a carbonate compound, a sulfate compound and a sultone compound.

The carbonate compound may be at least one selected from the group consisting of vinylene carbonate and vinylene ethylene carbonate. When the carbonate compound is added into the non-aqueous electrolyte solution as the additive, 1.5 to 3% by weight of the carbonate compound may be added based on the total amount of the electrolyte solution.

The sulfate compound may be ethylene sulfate. When the sulfate compound is added into the non-aqueous electrolyte solution as the additive, 0.5 to 1.5% by weight of the sulfate compound may be added based on the total amount of the electrolyte solution.

The sultone compound may be 1,3-propane sultone. When the sultone compound is added into the non-aqueous electrolyte solution as the additive, 0.5 to 1% by weight of the sultone compound may be added based on the total amount of the electrolyte solution.

The lithium secondary battery in accordance with an example embodiment of the present invention may include a cathode, an anode, a separator disposed between the cathode and the anode and the non-aqueous electrolyte solution. The cathode and the anode may respectively include a cathode active material and an anode active material.

The cathode active material may include a manganese spinel active material, a lithium metal oxide or a mixture thereof. In addition, the lithium metal oxide may be selected from the group consisting of a lithium-manganese oxide, a lithium-nickel-manganese oxide, a lithium-manganese-cobalt oxide and a lithium-nickel-manganese-cobalt oxide. More particularly, the lithium metal oxide may include $LiCoO_2$, $LiNiO_2$, $LiMnO_2$, $LiMn_2O_4$, $Li(Ni_aCo_bMn_c)O_2$ (in which, $0<a<1$, $0<b<1$, $0<c<1$, $a+b+c=1$), $LiNi_{1-Y}Co_YO_2$, $LiCo_{1-Y}Mn_YO_2$, $LiNi_{1-Y}Mn_YO_2$ (in which, $0 \leq Y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ (in which, $0<Z<2$).

The anode active material may include a carbon-based anode active material such as crystalline carbon, amorphous carbon or a carbon complex. These materials may be used alone or as a mixture of two or more.

The separator may be a porous polymer film made by using a polyolefin polymer, for example, an ethylene homopolymer, a propylene homopolymer, an ethylene/butene copolymer, an ethylene/hexene copolymer and an ethylene/methacrylate copolymer, etc. The separator may be formed by a single porous polymer film or may be formed by laminating two or more. Besides, commonly used porous non-woven fabric, for example, a non-woven fabric including a glass fiber having a high melting point, a polyethylene terephthalate fiber, etc. may be used without limitation.

EXAMPLES

Hereinafter, examples and experiments will be described in more detail, however, the present invention will not be limited to the following examples and experiments.

Example 1

Preparation of Electrolyte Solution

In a mixture solvent including an organic solvent including ethylene carbonate (EC):ethyl methyl carbonate (EMC)=3:7 by volume, and 1.0M of $LiPF_6$, 3% by weight of vinylene carbonate (VC), 1.5% by weight of 1,3-propane sultone and 1.5% by weight of ethylene sulfate based on the total amount of an electrolyte solution were added. 1% by weight of LiODFB and 0.2% by weight of TMSP were additionally added to the mixture solvent to prepare a non-aqueous electrolyte solution.

[Manufacture of Lithium Secondary Battery]

A mixture including a manganese spinel active material and a lithium-nickel-manganese-cobalt oxide as a cathode active material, polyvinylidene fluoride (PVdF) as a binder and carbon as a conductive material were mixed to prepare a cathode slurry. The cathode slurry was coated on an aluminum current collector, dried and rolled to manufacture a cathode.

Natural graphite as an anode active material, PVdF binder and a viscosity increasing agent were mixed and dispersed in water to prepare an anode slurry. The anode slurry was coated on a copper current collector, dried and rolled to manufacture an anode.

A battery was manufactured by using the thus obtained cathode and anode along with a PE separator by means of a common method. Then, the thus prepared non-aqueous electrolyte solution was injected into the battery to manufacture a lithium secondary battery.

Example 2

A non-aqueous electrolyte solution and a lithium secondary battery were obtained by conducting the same procedure described in Example 1, except for adding 1% by weight of LiTFOP and 0.2% by weight of TMSP.

Example 3

A non-aqueous electrolyte solution and a lithium secondary battery were obtained by conducting the same procedure described in Example 1, except for adding 1% by weight of LiBOB and 0.2% by weight of TMSP.

Comparative Example 1

A non-aqueous electrolyte solution and a lithium secondary battery were obtained by conducting the same procedure described in Example 1, except for preparing an electrolyte solution excluding a lithium salt having an oxalato complex as an anion and TMSP as an additive.

Experiment 1

Lithium secondary batteries according to Examples 1 to 3 were charged and discharged from 0.5 C to 4 C according to the state of charge (SOC) at −30° C. for 10 seconds. From the generated voltage difference, the charge power and discharge power at a low temperature were calculated. The results are illustrated in FIGS. 1 and 2.

Referring to FIG. 1, from the results on the charge power at −30° C., the charge power characteristic at the low temperature was found to increase for the lithium secondary batteries according to Examples 1 to 3 by about 1.5 to about 2 times or over (3.0 to 4.0 or over/2.0) when comparing with the lithium secondary battery according to Comparative Example 1 when the SOC was 60%. Similarly, the power of the lithium secondary batteries according to Examples 1 to 3 at the low temperature was found to be improved when the SOC was 20%, 40%, 80% and 100% as when the SOC was 60%.

Figure 2:
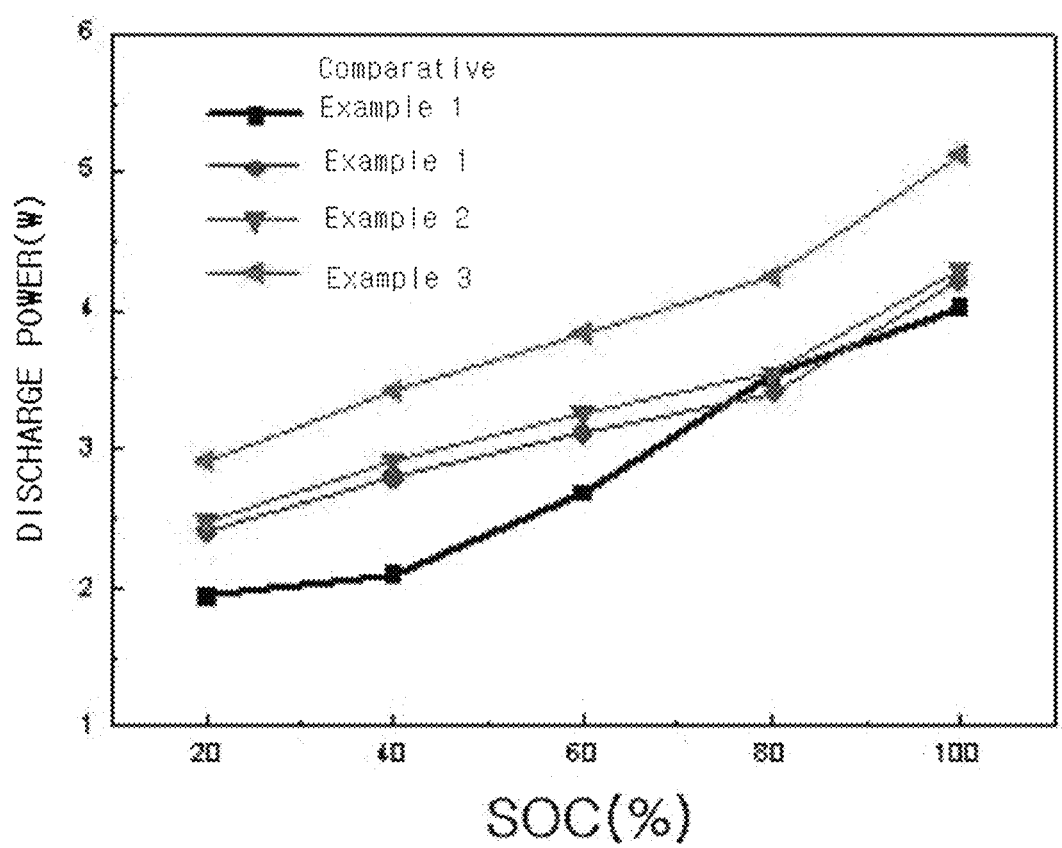
FIG. 2 is a graph illustrating a discharge power characteristic of a secondary battery including an additive for an electrolyte solution, measured at a low temperature (−30° C.) according to Experiment 1 of the present invention.

Referring to FIG. 2, from the results on the discharge power at −30° C., the discharge power characteristic at the low temperature was found to be increased for the lithium secondary batteries according to Examples 1 to 3 when comparing with the lithium secondary battery according to Comparative Example 1 when the SOC was 20%, 40% and 60%.

Therefore, the charge power and the discharge power at the low temperature for the lithium secondary battery including the additive for the electrolyte solution according to the present invention were improved when comparing with the lithium secondary battery including the electrolyte solution excluding the lithium salt having the oxalato complex as the anion and the TMSP. Similar effect was obtained when using the electrolyte solution including TMSP by 0.5% by weight.

Experiment 2

The lithium secondary batteries according to Examples 1 to 3 and Comparative Example 1 were charged at the temperature of 45° C. with constant current of 1 C=800 mA. After the voltage of the battery reached 4.2 V, a first time charging was conducted until the charge current reached 50 mA at the constant voltage of 4.2 V. With respect to the firstly charged battery, discharging was conducted until the battery voltage reached 3 V at the constant current of 1 C. Thus, a discharge capacity at the first cycle was obtained.

In succession, the charging and discharging were repeatedly conducted for 1,000 cycles using the batteries according to Examples 1 to 3 and Comparative Example 1, to measure discharge capacity for each of the cycles. In this case, the capacity retention (%) was obtained by following Mathematical Equation 1.

Capacity retention (%)=(discharge capacity for each cycle)/(discharge capacity at the first cycle)×100   [Mathematical Equation 1]

Figure 3:
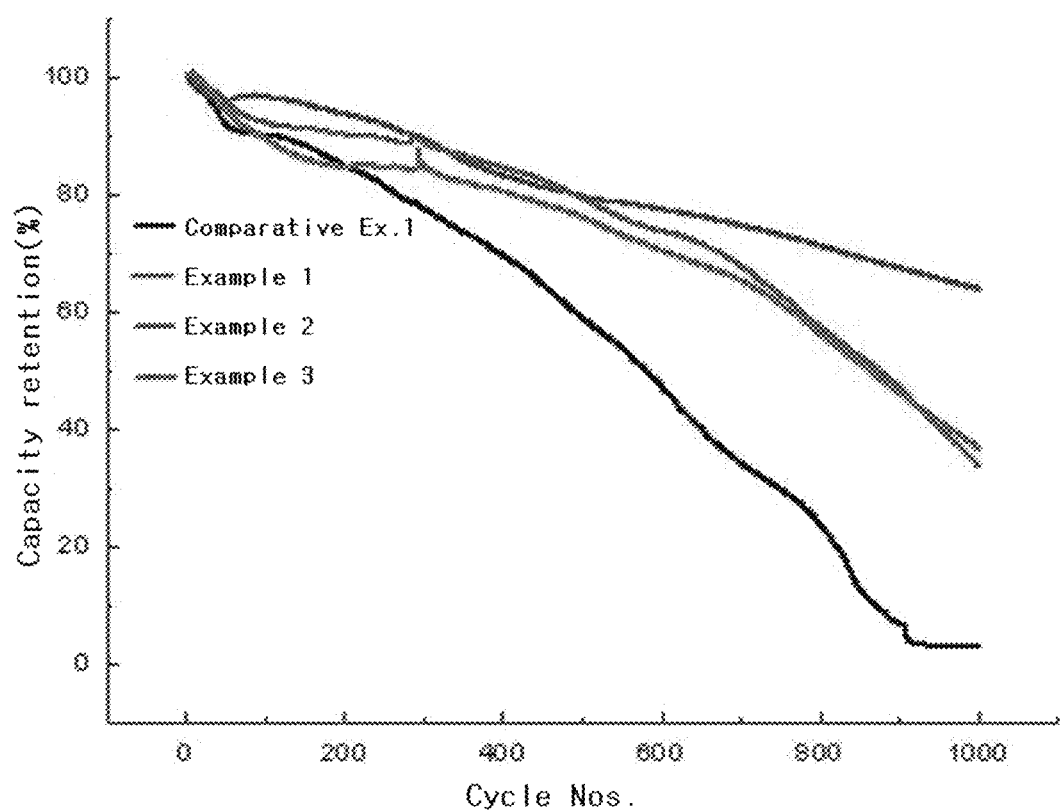
FIG. 3 is a graph illustrating a cycle property of a secondary battery including an additive for an electrolyte solution, measured at a high temperature (45° C.) according to Experiment 2 of the present invention.

Thus calculated capacity retention with respect to the batteries according to Examples 1 to 3 and Comparative Example 1 is illustrated in FIG. 3.

Referring to FIG. 3, the capacity retention of the battery including the electrolyte solution excluding the lithium salt having the oxalato complex as the anion and TMSP was found to be largely decreased after about 200 cycles when comparing with the capacity retentions of the batteries according to Examples 1 to 3. In addition, when considering the capacity retention at about 400 cycles, about 75% was maintained for the battery according to Comparative Example 1, while about 80% or over was maintained for the batteries according to Examples 1 to 3. The difference was increased as the increase of the number of the cycle. After about 700 cycles, the capacity retention of the batteries according to Examples 1 to 3 was about twice of that according to Comparative Example 1.

As described above, the lithium secondary batteries according to Examples 1 to 3 illustrated better cycle properties when comparing with the lithium secondary battery according to Comparative Example 1. From the result, a battery having a high capacitance and an improved lifetime characteristic was confirmed to be manufactured. Similar cycle property was obtained for the lithium secondary battery including TMSP by 0.5% by weight.

While the present invention has been shown and described in connection with the exemplary embodiments, it will be apparent to those skilled in the art that modifications and variations can be made without departing from the spirit and scope of the invention as defined by the appended claims.

What is claimed is:

1. A lithium secondary battery comprising:
   a cathode including a cathode active material, wherein the cathode active material is selected from the group consisting of a manganese spinel active material, a lithium metal oxide or a mixture thereof;
   an anode including an anode active material, wherein the anode active material is a carbon-based material;
   a separator interposed between the cathode and the anode; and
   an electrolyte solution comprising a lithium salt having an oxalato complex as an anion, tris(trimethylsilyl)phosphate (TMSP), and an additive,
   wherein the lithium salt is lithium tetrafluoro(oxalato)phosphate (LiTFOP),
   wherein the tris(trimethylsilyl)phosphate (TMSP) is present in an amount of 0.01 to 0.3% by weight based on a total amount of the electrolyte solution, and
   wherein the additive is at least one selected from the group consisting of a sulfate compound and a sultone compound.

2. The lithium secondary battery of claim 1, wherein the lithium salt is included in an amount of 0.2 to 2% by weight based on a total amount of the electrolyte solution.

3. The lithium secondary battery of claim 1, wherein the tris(trimethylsilyl)phosphate (TMSP) is present in an amount of 0.01 to 0.2% by weight based on a total amount of the electrolyte solution.

4. The lithium secondary battery of claim 1, wherein the electrolyte solution further comprises:
   a non-aqueous organic solvent; and
   a second lithium salt different than the lithium salt.

5. The lithium secondary battery of claim 4, wherein the second lithium salt is at least one selected from the group consisting of LiPF$_6$, LiBF$_4$, LiSbF$_6$, LiAsF$_6$, LiClO$_4$, LiN(C$_2$F$_5$SO$_2$)$_2$, LiN(CF$_3$SO$_2$)$_2$, CF$_3$SO$_3$Li, LiC(CF$_3$SO$_2$)$_3$ and LiC$_4$BO$_8$.

6. The lithium secondary battery of claim 1, wherein the sulfate compound is ethylene sulfate and the sultone compound is 1,3-propane sultone.

7. The lithium secondary battery of claim 1, wherein the lithium metal oxide is at least one selected from the group consisting of a lithium-manganese oxide, a lithium-nickel-manganese oxide, a lithium-manganese-cobalt oxide and a lithium-nickel-manganese-cobalt oxide.

8. The lithium secondary battery of claim 1, further comprising a carbonate compound as a second additive.

9. The lithium secondary battery of claim 8, wherein the carbonate compound is at least one selected from a group consisting of vinylene carbonate and vinyl ethylene carbonate.

10. The lithium secondary battery of claim 1, wherein the carbon-based material is selected from the group consisting of crystalline carbon, amorphous carbon, a carbon complex, or combinations thereof.

11. The lithium secondary battery of claim 1, wherein the battery has a capacity retention of at least 20% after 1,000 cycles, wherein the capacity retention for each cycle was obtained by charging the battery at a temperature of 45° C. with a constant current of 1 C to a voltage of 4.2 V, and then discharging the battery to 3 V at the constant current.

12. A lithium secondary battery comprising:
a cathode including a cathode active material, wherein the cathode active material is selected from the group consisting of a manganese spinel active material, a lithium metal oxide or a mixture thereof;
an anode including an anode active material, wherein the anode active material is a carbon-based material;
a separator interposed between the cathode and the anode; and
an electrolyte solution comprising a lithium salt having an oxalate complex as an anion, tris(trimethylsilyl)phosphate (TMSP), and an additive,
wherein the lithium salt is lithium tetrafluoro(oxalate) phosphate (LiTFOP),
wherein the tris(trimethylsilyl)phosphate (TMSP) is present in an amount of 0.01 to 0.3% by weight based on a total amount of the electrolyte solution, and
wherein the additive is the combination of a sulfate compound, a sultone compound, and a carbonate compound.

13. The lithium secondary battery of claim 12, wherein the tris(trimethylsilyl)phosphate (TMSP) is present in an amount of 0.01 to 0.2% by weight based on a total amount of the electrolyte solution.

14. The lithium secondary battery of claim 12, wherein the sulfate compound is ethylene sulfate, the sultone compound is 1,3-propane sultone, and the carbonate compound is vinylene carbonate or vinyl ethylene carbonate.

15. The lithium secondary battery of claim 12, wherein the sulfate compound is ethylene sulfate, the sultone compound is 1,3-propane sultone, and the carbonate compound is at least one selected from a group consisting of vinylene carbonate and vinyl ethylene carbonate.

16. The lithium secondary battery of claim 12, wherein the carbon-based material is selected from the group consisting of crystalline carbon, amorphous carbon, a carbon complex, or combinations thereof.

17. The lithium secondary battery of claim 12, wherein the battery has a capacity retention of at least 20% after 1,000 cycles, wherein the capacity retention for each cycle was obtained by charging the battery at a temperature of 45° C. with a constant current of 1 C to a voltage of 4.2 V, and then discharging the battery to 3 V at the constant current.

* * * * *